(12) United States Patent  (10) Patent No.: US 8,284,327 B2
Counts  (45) Date of Patent: Oct. 9, 2012

(54) VEHICLE FOR ENTERTAINMENT AND METHOD FOR ENTERTAINING

(75) Inventor: Michael R. Counts, Brooklyn, NY (US)

(73) Assignee: The Ride, Inc., New York, NY (US)

( * ) Notice: Subject to any disclaimer, the term of this patent is extended or adjusted under 35 U.S.C. 154(b) by 353 days.

(21) Appl. No.: 12/686,268

(22) Filed: Jan. 12, 2010

(65) Prior Publication Data

US 2011/0169293 A1    Jul. 14, 2011

(51) Int. Cl.
*H04N 5/66*    (2006.01)
(52) U.S. Cl. ................... 348/739; 348/750; 348/61
(58) Field of Classification Search .............. 348/739, 348/750, 61
See application file for complete search history.

(56) References Cited

U.S. PATENT DOCUMENTS

| | | | |
|---|---|---|---|
| 2,434,857 A | | 1/1948 | Larson |
| 4,964,671 A | | 10/1990 | Millar |
| 6,126,218 A | * | 10/2000 | Karhumaki ............. 296/21 |
| 6,700,602 B1 | | 3/2004 | Blair |
| 7,092,542 B2 | | 8/2006 | McGrath |
| D531,933 S | | 11/2006 | Delamour |
| 2003/0229446 A1 | * | 12/2003 | Boscamp et al. .......... 701/213 |
| 2006/0002110 A1 | | 1/2006 | Dowling et al. |
| 2007/0297619 A1 | | 12/2007 | Pan |
| 2008/0311983 A1 | | 12/2008 | Koempel et al. |

OTHER PUBLICATIONS

International Search Report and Written Opinion for PCT International Patent Application No. PCT/US2011/020956, mailed Mar. 9, 2011.
Cropper et al., Branding the Urban Landscape, MIT Communications Forum, Apr. 21, 2005, obtained from url: <http://web.mit.edu/comm-forum/forums/branding_urban_landscape.htm>.
Twin Trailers Link Up to Make a 100 Seat Auditorium on Wheels, Popular Science, Aug. 1954, p. 125.

* cited by examiner

*Primary Examiner* — Djenane Bayard
(74) *Attorney, Agent, or Firm* — Bryan W. Bockhop; Bockhop & Associates, LLC

(57) ABSTRACT

A vehicle includes a cabin defined by a front, a back, a roof, a floor, a first side, and a second side opposite the first side. The vehicle also includes a window having a surface area that covers at least 50% of the first side, and seating in the cabin arranged to face the first side. The seating may be arranged in at least two rows, with a first row of seats having a first elevation relative to the floor, and a second row of seats having a second elevation relative to the floor, where the second elevation being greater than the first elevation. The vehicle also includes a video system comprising a plurality of video monitors located at the first side. Other variations and a related method of providing entertainment using vehicles of the claimed type are also described herein.

36 Claims, 8 Drawing Sheets

VEHICLE FOR ENTERTAINMENT AND METHOD FOR ENTERTAINING

FIELD

The present application is generally related to the field of entertainment. More specifically, the present application is related to a vehicle that may be used as part of an entertainment experience, and a method for providing entertainment.

BACKGROUND

One of the oldest and most traditional forms of entertainment is the live show. Although many believe that formal live plays and musicals date back to the ancient civilizations, such as the Greeks, it can be imagined that they are even older still, starting with the first storyteller who acted out a character when telling a tale in front of a fire. Framed houses of entertainment, like the countless theatres that make up New York City's Broadway, share much with the Theatre of Dionysus that was built around 325 BCE in Athens. While sets and lighting have become far more intricate and technologically advanced than those of early theatres, the basic idea that the audience members will sit in a seat and watch a performance that is limited to a confined area and field of view remains.

With the advent of film, prerecorded movies and shows have facilitated changes in environment in a way not possible for a live event. Multiple or moving cameras allow for more lifelike scenes, as many can be filmed on location, and drastic changes can be seamlessly cut together. Again, however, the border of the screen, like the proscenium arch of the stage, clearly demarcates the boundary between the scene of entertainment and those who are watching it. Once more, the audience member sits in a seat and watches a performance take place in an essentially static environment.

There is another form of entertainment, however, that is very different from the arts described above. In this form of entertainment, the amusement park ride, participants are generally moved, occasionally at very high speeds, providing thrills not only from the changes of perspective, but also from the very fact of the motion. Such rides are generally designed to be confined to the boundaries of the amusement park, or a subset of the amusement park, and therefore are limited in functionality. They often are confined to a fixed immovable track, or wholly enclosed within a building. Also, because amusement parks require large numbers of patrons to absorb operating expenses, such rides are designed with brevity of duration in mind.

It is desirable to provide various improvements over known systems and methods of providing entertainment, including but not limited to the forms described above.

SUMMARY

According to an aspect of the invention, there is provided a vehicle that includes a cabin defined by a front, a back, a floor, a roof, a first side connecting the front, back, roof, and floor, and second side connecting the front, back, roof, and floor. The front of the vehicle cabin is defined as forward of the back relative to the direction of movement of the vehicle when the vehicle moves forward. The vehicle also has a window, wherein the surface area of the window covers at least fifty percent (50%) of the first side of the cabin. The vehicle further has a plurality of seats in the cabin, arranged to face the first side in at least two rows, wherein the first row of seats has a first elevation relative to the floor, while the second row of seats has a second elevation, higher than the first elevation, relative to the floor. The vehicle also has video system comprising a plurality of video monitors supported by the first side.

According to an aspect of the invention, there is provided a method for providing entertainment. The method includes providing a live event outside a vehicle that includes a window having a surface area covering at least 50% of a side of the vehicle, and a plurality of video monitors located at the side of the vehicle, so that the live event may be seen through the window of the vehicle; and displaying video content on the video monitors, the video content being associated with the live event.

Other aspects, features, and advantages of the present application will become apparent from the following detailed description, the accompanying drawings, and the appended claims.

BRIEF DESCRIPTION OF THE DRAWINGS

Features of the invention are shown in the drawings, in which like reference numerals designate like elements. The drawings form part of this original disclosure in which.

DETAILED DESCRIPTION

Figure 1:
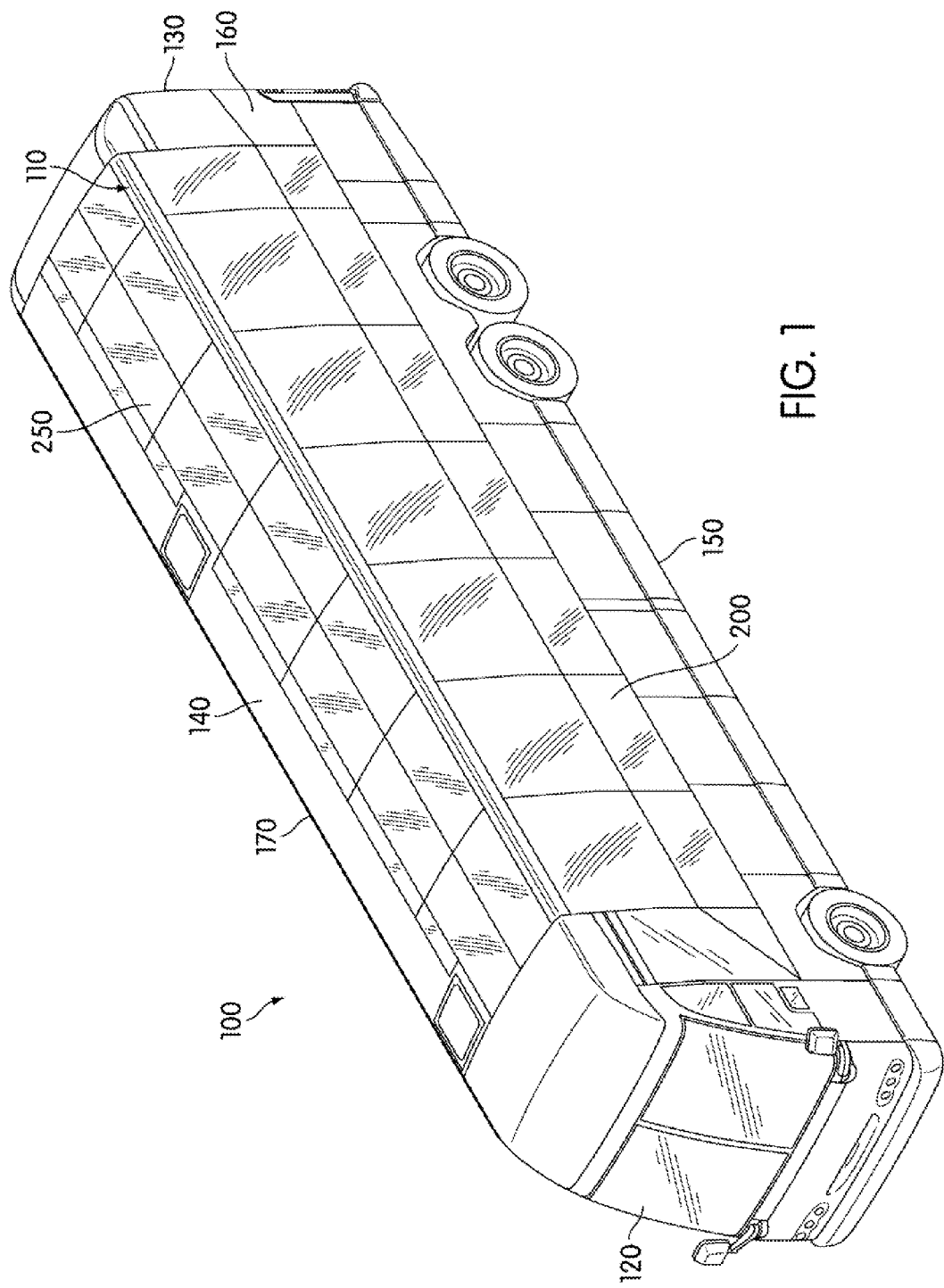
FIG. 1 is a perspective view of a vehicle in accordance with an embodiment of the invention.

FIG. 1 illustrates a vehicle 100 in accordance with embodiments of the invention. The vehicle 100 may be of any suitable material or construction, generally of an elongated nature, including but not limited to a bus, a truck with attached trailer, a trolley, an articulated bus, or a train. The vehicle comprises a cabin 110 that is defined by a front 120, a back 130, a roof 140, and a floor 150. The vehicle also has a first side 160 that connects the front 120, the back 130, the roof 140, and the floor 150, and a second side 170, that connects the front 120, the back 130, the roof 140, and the floor 150. The front 120 is defined as being forward of the back 130 relative to a direction of movement when the vehicle 100 moves in a forward direction.

The vehicle 100 may be powered by and driven by any suitable power source and drive train. Examples of suitable power sources include, but are not limited to gasoline or diesel engines, and alternative energy systems, including but not limited to those that run off of electricity such as electric motors, hybrid-electric motors, fuel cells, and so on. The engine may be built into the vehicle, as in a bus, or may be detachable, as in a truck and trailer.

As illustrated in FIG. 1, at least 50% of the surface area of the first side 160 is comprised of a window 200. In an embodiment, about 66% of the surface area of the first side 160 is comprised of the window 200, as generally illustrated. The window 200 may be of any suitable material or construction, including but not limited to glass and plastic, that provides sufficient transparency to allow those inside the vehicle to see through the window 200. The window 200 may be comprised of a single uninterrupted pane or a series of window panes. The window 200 may be configured to be closed at all times, or the window 200 may be configured to be opened. The illustrated embodiment is not intended to be limiting in any way.

Figure 2:
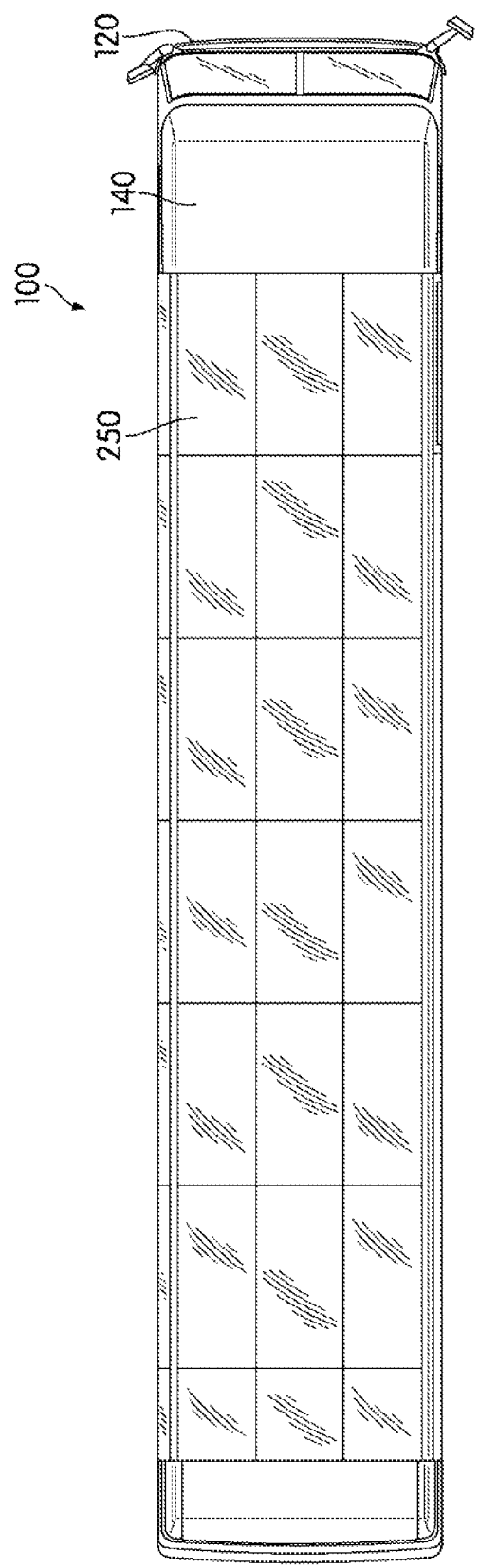
FIG. 2 is a top view of a vehicle in accordance with an embodiment of the invention.

In an embodiment, there may be a second window 250, comprising at least 50% of the roof 140. In an embodiment, the second window 250 comprises about 75% of the roof 140, as generally illustrated in FIG. 1, and in an embodiment, the second window 250 comprises about 100% of the roof 140, as illustrated in FIG. 2. In embodiments where the second window 250 is less than 100% of the roof 140, the window may be positioned anywhere on the roof 140, but desirably on a portion of the roof 140 near the first side 160. As noted above with respect to the window 200 on the first side 160, the second window 250 may be of any suitable material or construction, and may be comprised of a single uninterrupted pane or a series of panes. Likewise, the second window 250 may be fixedly closed, or may be configured to be opened. The illustrated embodiments are not intended to be limiting in any way.

Figure 3:
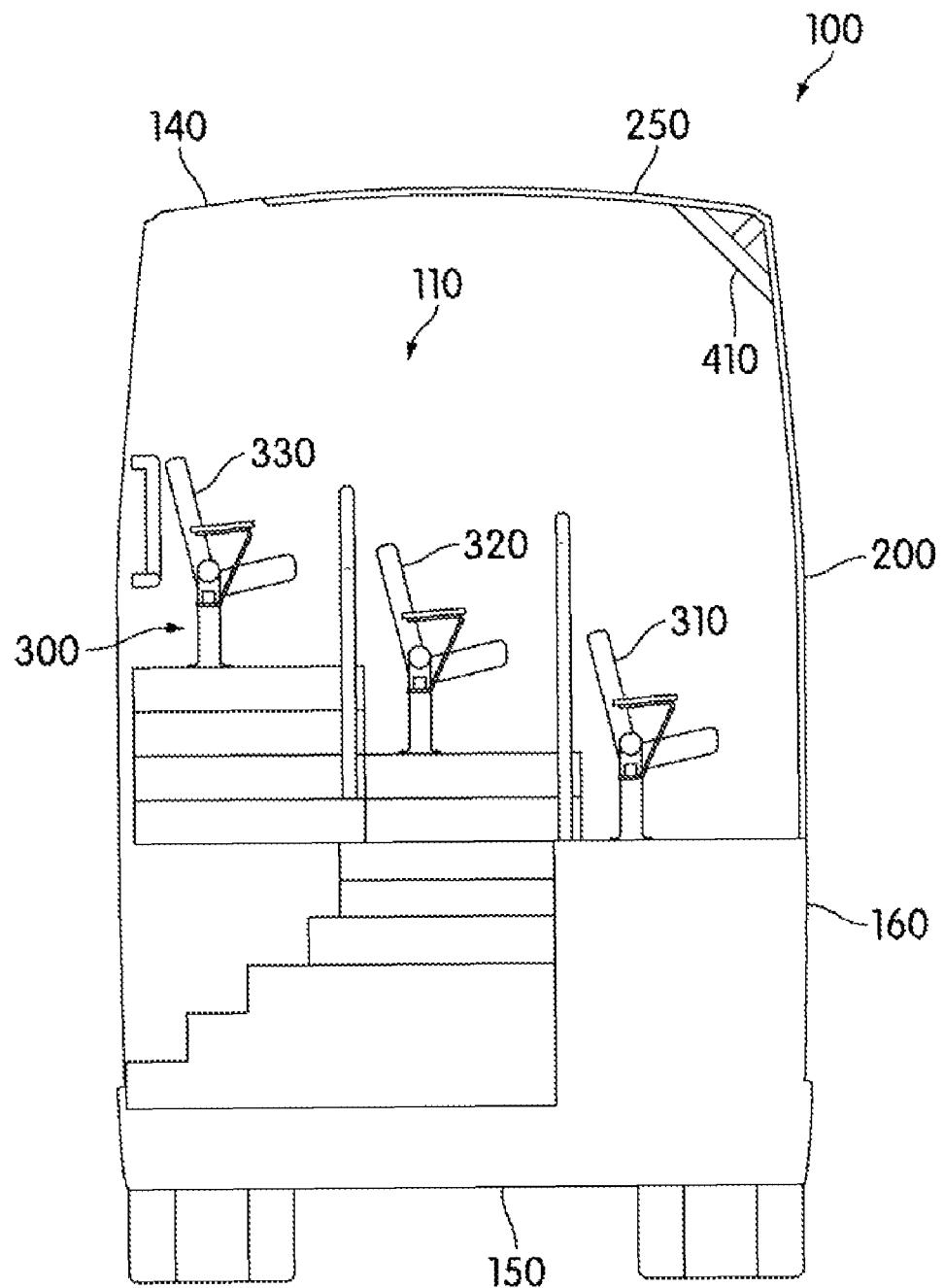
FIG. 3 is a front cutaway view of the interior of the vehicle of FIG. 1.
Figure 4:
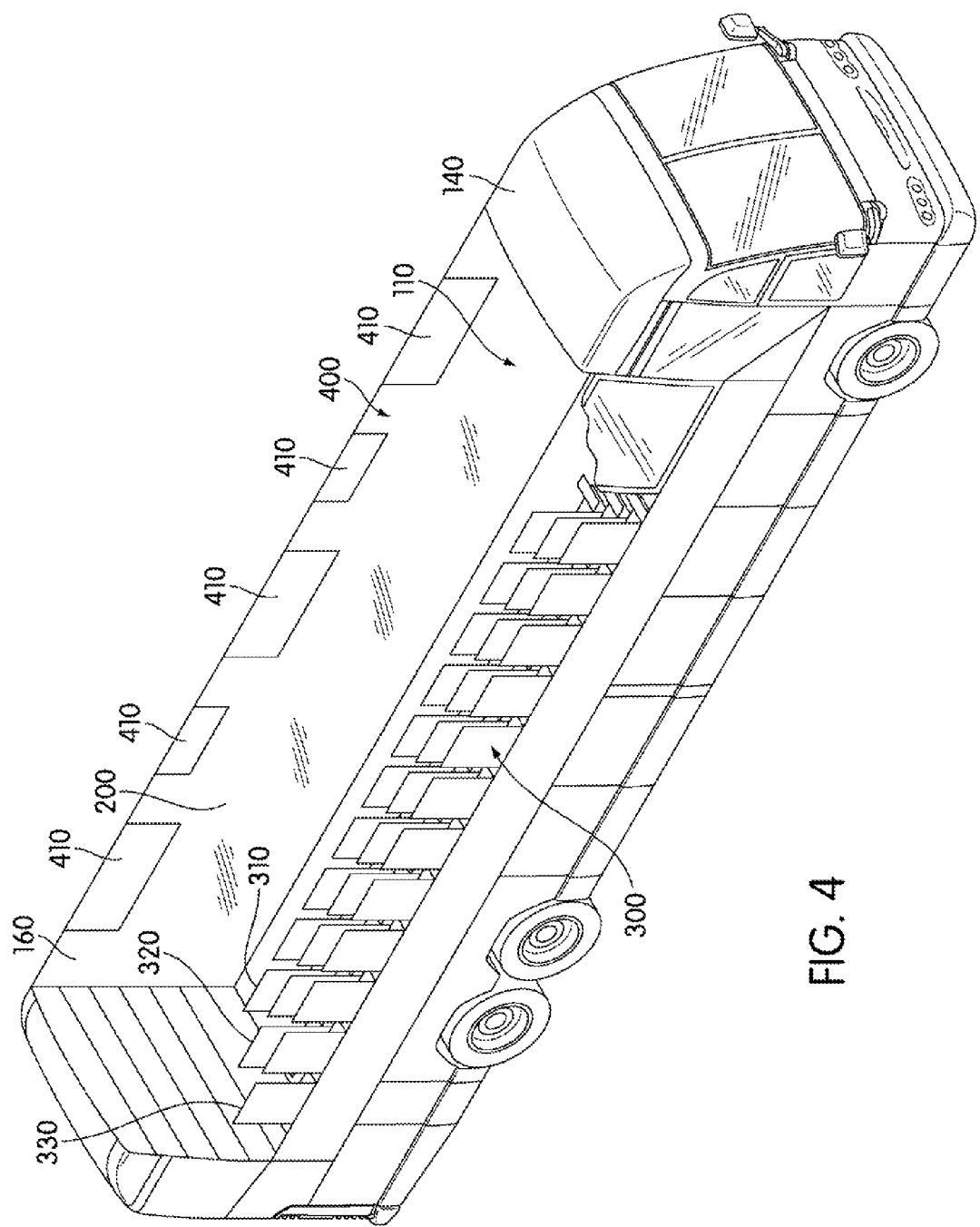
FIG. 4 is a top perspective cutaway view of the interior of the vehicle of FIG. 1.

The vehicle 100, as depicted in FIG. 3 and FIG. 4, further comprises a plurality of seats 300 in the cabin 110, arranged to face the first side 160. The seats 300 may be of any suitable material, including plastic, fabric, foam, metal, wood and so on. The seats 300 may also be of any suitable construction, including benches, stadium seating, bucket seats, etc. The plurality of seats 300 are arranged in at least two rows of differing elevations, providing persons seated in rows away from the window 200 a view over the heads of persons seated in rows closer to the window 200. In the embodiment illustrated in FIG. 3 and FIG. 4, there are three rows of seats, with a first row of seats 310 having a first elevation relative to the floor 150, a second row of seats 320 having a second elevation, higher than the first elevation, and a third row of seats 330 having a third elevation higher than the first and second elevations. In an embodiment, the seats in each row may be staggered relative to an adjacent row which may enhance the visibility of persons who are seated in rows away from the window 200.

As shown in FIG. 4, the vehicle 100 additionally has a video system 400 comprising a plurality of video monitors 410 supported along the first side 160. The support for the video monitors 410 can be of any suitable construction, and can be mounted to any suitable portion of the cabin 110 along the first side 160, including the roof 140, the first side 160, and the window 200. In embodiments with the second window 250, the mounting mechanism for the video monitors 410 can be supported by the second window 250. As shown in FIG. 3, the video monitors 410 can also be mounted to the intersection of any of the above-listed elements in the cabin, provided that they are supported along the length of the first side 160. The video monitors 410 can be of any suitable configuration, including but not limited to Liquid Crystal Displays (LCDs), Cathode Ray Tubes (CRTs), Light Emitting Diode displays (LEDs), plasma displays, Organic LEDs (OLEDs), and so on. The video monitors 410 can also be in any suitable arrangement, including a continuous series of display panels, or a plurality of individual monitors spaced apart from one another along the length of the first side 160, as illustrated in FIG. 4.

The content provided by the video monitors 410 may be of any configuration. In some embodiments, the video system 400 may be configured to provide different video content to at least two of the video monitors 410. In some embodiments, the video system 400 may be configured to provide video content to the video monitors 410 that correspond with content outside the vehicle 100 that is generally visible through the window 200. The video system 400 may be synchronized with the movement of the vehicle 100, as discussed in further detail below.

Figure 5:
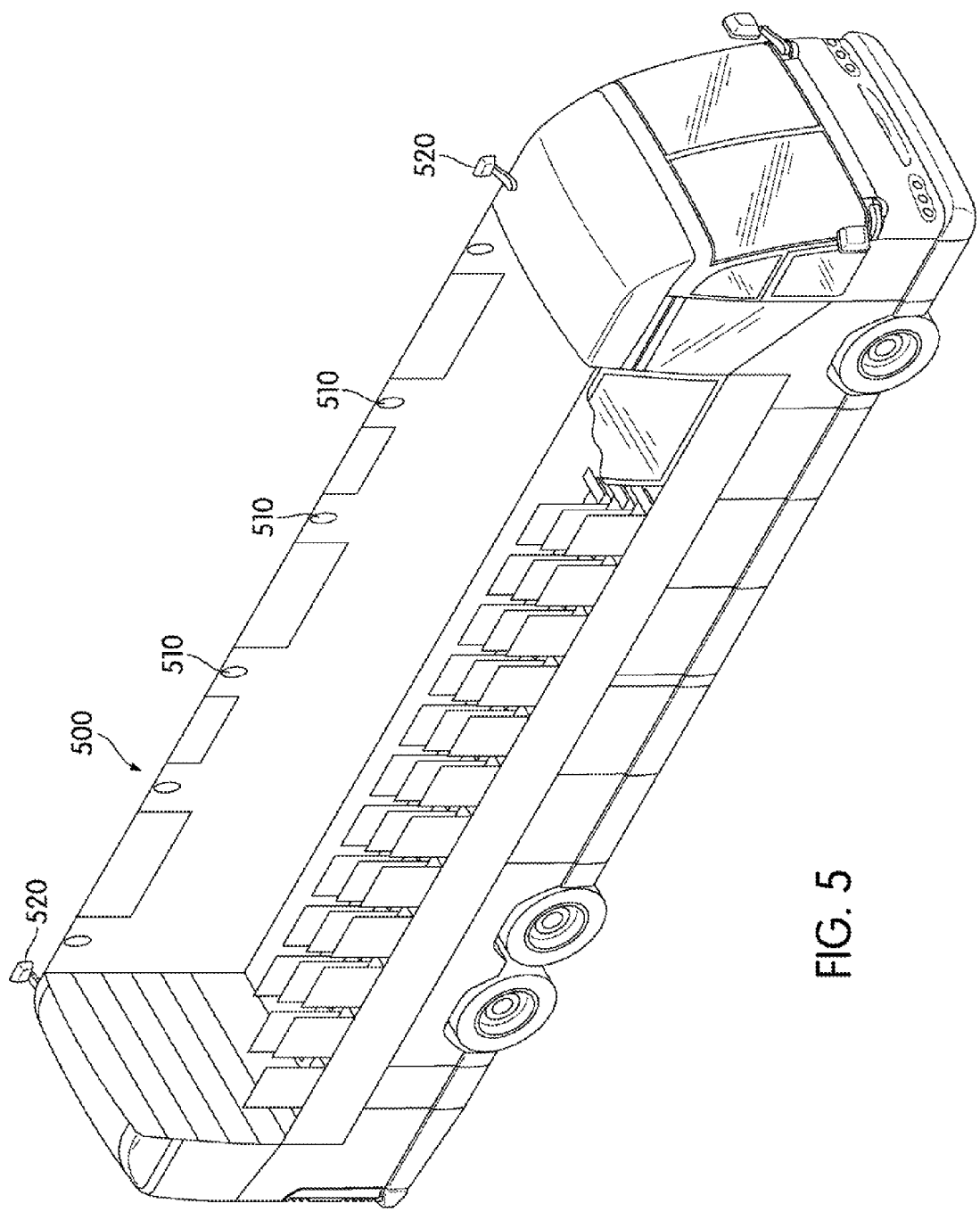
FIG. 5 is a top perspective cutaway view of a vehicle in accordance with an embodiment of the invention.

As seen in FIG. 5, the vehicle 100 may comprise an audio system 500 that includes a plurality of inside speakers 510 within the cabin 110. The inside speakers 510 may be of any suitable construction or configuration, including but not limited to embedded into or mounted on the plurality of seats 300, embedded into or mounted on the defining walls of the cabin 110, suspended from the roof 140, standing on the floor 150, embedded into or mounted on the video monitors 410, and so on. In an embodiment, the inside speakers 510 may be located in the cabin 110 in a manner that provides so-called surround sound to the passengers sitting in the plurality of seats 300, similar to a movie theatre. In an embodiment, the audio system 500 may include a plurality of outside speakers 520 that are mounted to the exterior of the vehicle 100. The outside speakers 520 may be of any suitable construction or configuration, including but not limited to bullhorn speakers, all-weather speakers, a public announcement system, and so on. The audio system 500 may be synchronized with the movement of the vehicle 100, as discussed in further detail below.

Figure 6:
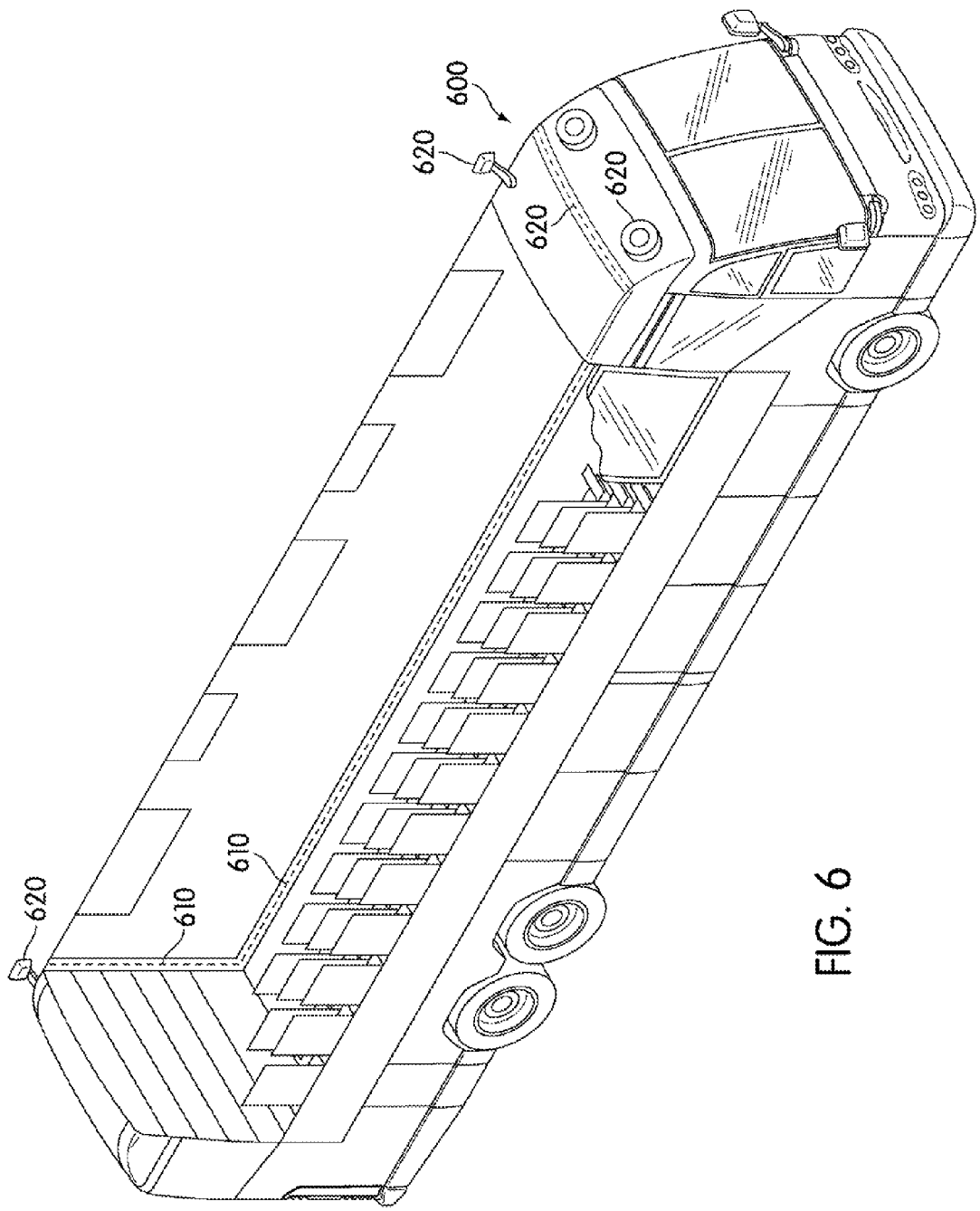
FIG. 6 is a top perspective cutaway view of a vehicle in accordance with an embodiment of the invention.

As seen in FIG. 6, the vehicle 100 may comprise a lighting system 600. The lighting system 600 may include indoor lights 610 within the cabin 110. The indoor lights 610 may be of any suitable construction, including but not limited to incandescent lights, spot lights, LED lights, fluorescent lights, black lights, neon lights, and rope lighting. The lighting system 600 may also include outdoor lights 620, located outside of the cabin 110. These outdoor lights 620 too may be of any suitable construction, including but not limited to incandescent lights, spot lights, LED lights, fluorescent lights, black lights, neon lights, and rope lighting. In an embodiment, at least one of the outdoor lights 620 may be pointedly directed to illuminate an area outside of window 200.

Figure 7:
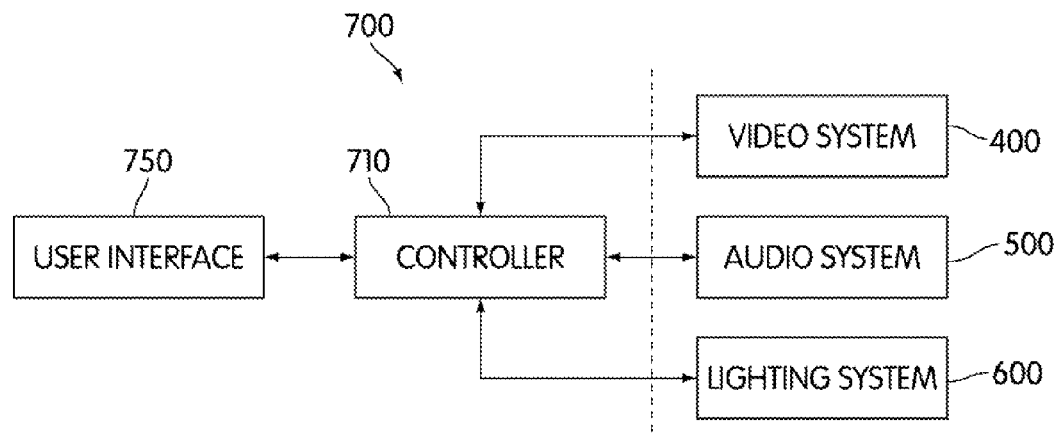
FIG. 7 is a schematic view of an audio/visual system in accordance with an embodiment of the invention.

In an embodiment, the video system 400, the audio system 500, and/or the lighting system 600 are part of an audio/visual system 700, and are configured to be synchronized with one another. As seen in FIG. 7, the synchronization may be controlled by a controller 710, which may operate through any suitable method, including but not limited to electronic hardware, computer software, manual manipulation, and so on. The vehicle 100 may further comprise a user interface 750 in communication with the controller 710, the interface being configured to allow a user to change images and/or sounds that are being outputted by the video monitors and speakers respectively. This user interface 750 may be of any suitable type or configuration, including but not limited to comprising a keyboard, a plurality of switches, a plurality of sliders, a mixing board, a computer, and so on. The user interface 750 may additionally be of any suitable form, including but not limited to a wired device, a wireless device, a handheld device, and so on.

In addition, the user interface 750 may be placed in any suitable location on the vehicle, including but not limited to an area near the driver of the vehicle 100, an area near the back 130 of the cabin 110, or an area inside the cabin 110. In an embodiment, the user interface 750 may be located in an area hidden from view from persons in the plurality of seats 300. In an embodiment, the user interface may be in an area outside the vehicle 100, wherein communication with the controller 710 is accomplished by any suitable means, including but not limited to via the interne, via radio control, via satellite communication, via a cellular network, and so on. In an embodiment with a user interface 750, the controller 710 may merely be a pass through between the user interface 750 and the individual subsystems of the audio-visual system 700.

In an embodiment, the controller 710 may be configured to automatically control the power provided to the lighting system 600, or the intensity of the lighting system 600. For example, the controller 710 may control the intensity of each of the indoor lights 610, and each of the outdoor lights 620. In various embodiments, this may be controlled automatically, or through the user interface 750. In an embodiment, the controller 710 may synchronize each of the indoor lights 610 and/or each of the outdoor lights 620 to the video system 400 and/or the audio system 500.

Figure 8:
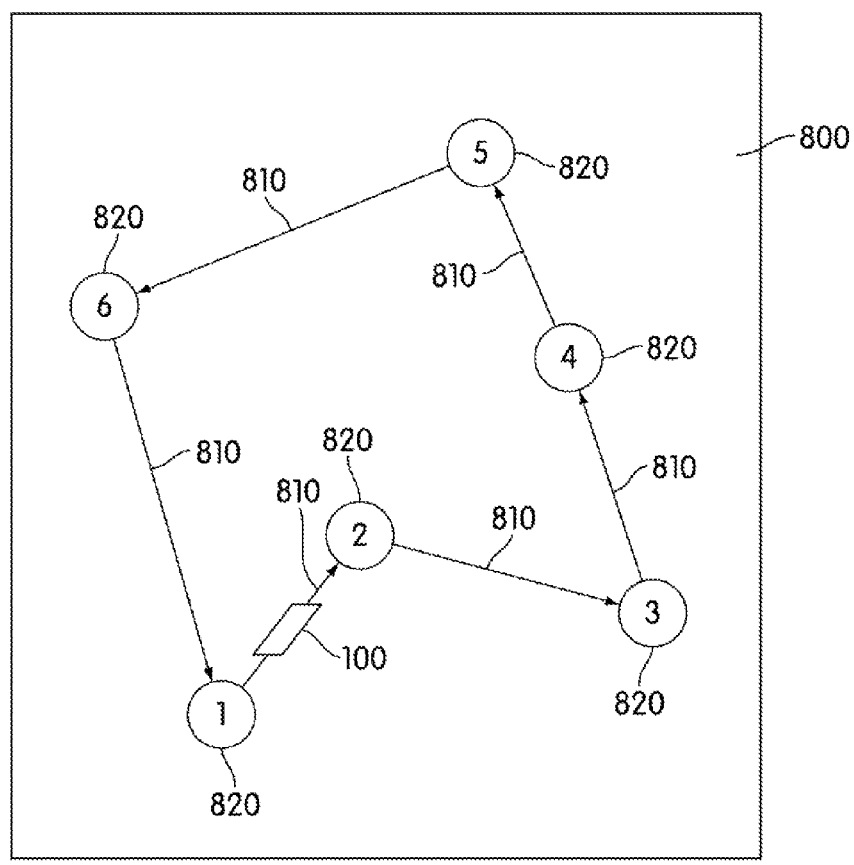
FIG. 8 is a schematic view of a city in which the vehicle of embodiments of the present invention may be used.

In some embodiments, the controller 710 may be in communication with a tracking system that tracks the speed and/or position of the vehicle 100. In an embodiment, the controller 710 may be connected to or include a global positioning system (GPS) that may be used to provide the location of the vehicle 100 to the controller 710 so that the controller 710 can control the content of the video system 400 and audio system 500, as well as control the lighting system 600 based on the specific location of the vehicle 100. In an embodiment, the tracking system may detect the speed of the vehicle 100, and depending on the speed of the vehicle 100, the volume of the inside speakers 510 may be automatically adjusted to increase to account for road noise. In some embodiments, the controller may use the speed of the vehicle 100 to adjust the output of the video monitors 410. As a non-limiting example, the controller 710 may determine the position of the vehicle 100 along a defined route 810, as depicted in FIG. 8, and display certain video content based upon the calculated position of the vehicle 100 along the defined route 810.

Figure 9:
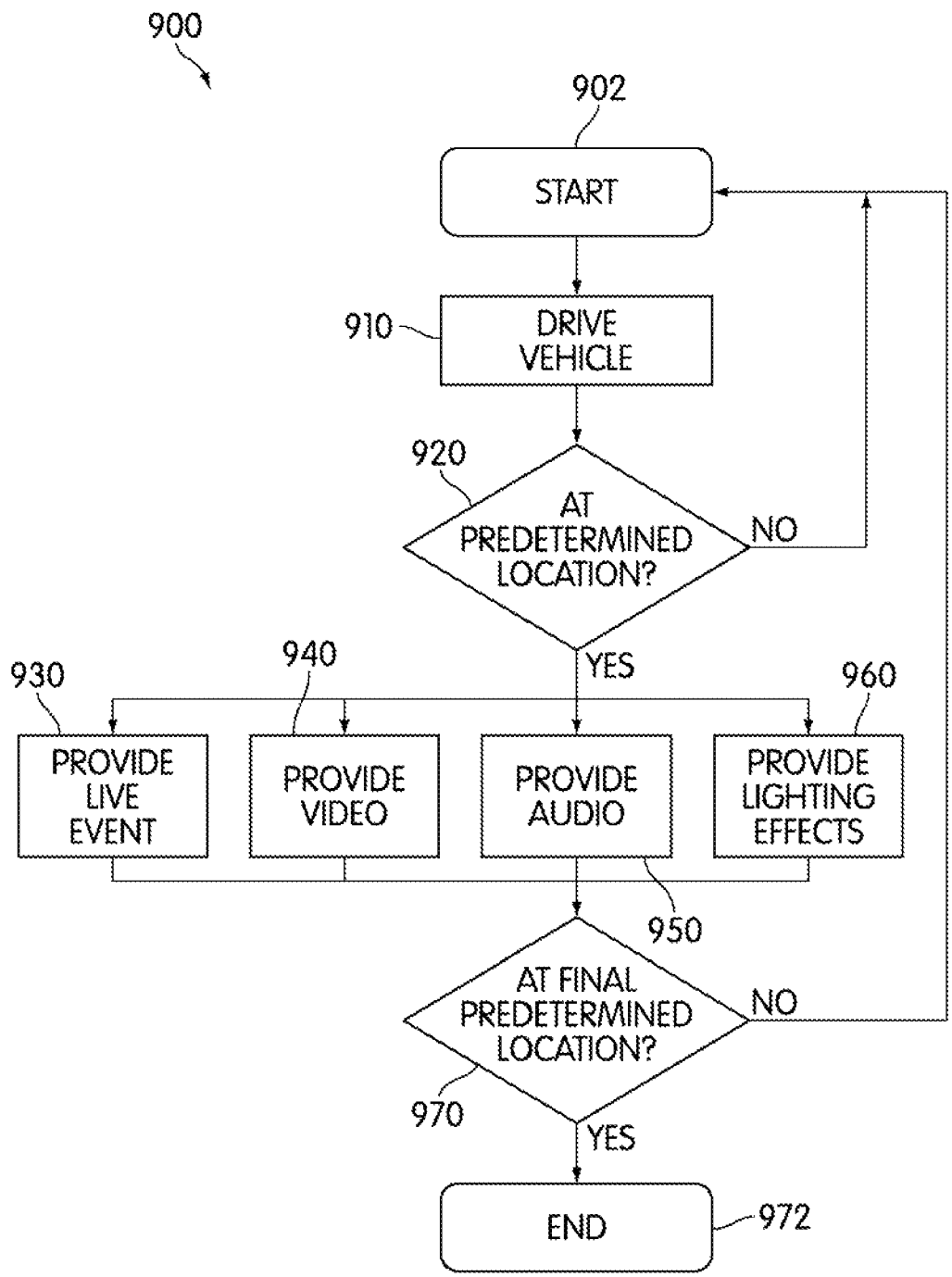
FIG. 9 is a flow diagram depicting a method for providing entertainment in accordance with an embodiment of the invention.

Embodiments of the vehicle 100 described above may be used in a method for providing entertainment 900. In an embodiment depicted in FIG. 8 and FIG. 9, the method starts at 902 and may include at 910 driving the vehicle 100 in a city 800, along a predetermined route 810. The city may be of any size or population density, including but not limited to New York City, Chicago, Paris, Washington D.C., San Francisco, London, Tokyo, Houston, Scranton, and so on. The predetermined route 810 can be of any length and configuration, including but not limited to a loop, a figure-eight, a straight line, and so on. Along the predetermined route 810 may be a plurality of predetermined locations 820. In an embodiment, the predetermined route 810 may only be defined as to the plurality of predetermined locations 820, such that the vehicle 100 may take any combination of streets to arrive at each predetermined location. In an embodiment, the vehicle 100 may be driven off the predetermined route 810, to account for dynamic events including but not limited to traffic, road maintenance, city events, improvised points of interest, and so on. In an embodiment, the vehicle 100 remains stationary. At 920, it is determined whether the vehicle 100 has reached a predetermined location 820. In an embodiment, the predetermined location 820 may be the vehicle's starting location. If the vehicle has not reached a predetermined location 820, the method may return to 910 and the vehicle may continues to be driven along the predetermined route 810. If the vehicle has reached a predetermined location 820, a live event may be shown at 930. The live event may be of any suitable configuration or type, including but not limited to live performances of music, acting, sideshow features, dance, drama, acrobatics, circus acts, and so on. In an embodiment, different types of live events or performances 930 may be provided in at least two of the predetermined locations 820. At each of the plurality of predetermined locations 820, the vehicle 100 may generally be positioned in a way so that those inside the vehicle cabin 110 can look through the window 200 and see the live event 930. In an embodiment, the vehicle may come to a stop at the predetermined location 820 for the duration of the live event 930. In an embodiment, the live event 930 may be inside the cabin 110 of the vehicle 100, including but not limited to the performance of a disk jockey (DJ), a video jockey (VJ), a master of ceremonies (MC), at least one planted actor in at least one of the plurality of seats 300, and so on.

In an embodiment, simultaneous with the live event 930 there may be video content displayed via the video system 400 at 940, wherein the video content is associated with the live event 930. The video content can be of any suitable type or configuration, including but not limited to complementary imagery, contrasting imagery, written words, graphics, video commentary, and so on. In an embodiment, the different video content may be provided to at least two of the video monitors 410. In an embodiment, at least one of the video monitors 410 may display video content comprising a map of the predetermined route 810, and an indicator displaying the current position of the vehicle 100. In an embodiment, the method may also entail displaying video content on at least one of the video monitors 410 which is prerecorded. The method may also comprise broadcasting at least some video content that is displayed on at least one of the video monitors 410 from a location that is not part of the predetermined route.

In an embodiment, audio content may be delivered simultaneously with the live event 930 to a plurality of inside speakers 510, and/or a plurality of outside speakers 520 on the vehicle 100 at 950. This audio content may be of a number of forms, including but not limited to music, sounds associated with the live event 930, an enhancement of the audio from the performers in the live event 930, commentary on the live event 930, and sounds associated with the movement of the vehicle. In an embodiment the method may further comprise sensing a speed of the vehicle, and adjusting the audio content being delivered to the inside speakers based on this speed. This adjustment may include a change in the volume of the audio content delivered, a change in the content of the audio content delivered, or both. In an embodiment, the change in audio content over a plurality of inside speakers 510 could simulate a sound moving relative to the vehicle. In an embodiment, different audio content may be provided to at least two of the inside speakers 510. In an embodiment, different audio content may be provided to at least two of the outside speakers 520.

In an embodiment, lighting effects may be provided at 960, simultaneously with the live event 930. Providing lighting effects 960 may be accomplished by any suitable means, including but not limited to altering the power provided to the lighting system 600, or modifying the luminance of variable-luminance lights. In an embodiment, lighting effects may be provided in a way that differs in accordance with the live event 930, the video content, and/or the audio content at 960. In an embodiment, the indoor lights 610 may be adjusted in any number of ways, including but not limited to providing a wave effect, a strobe effect, or an effect that modulates the light according to music being provided over the audio system 500. In an embodiment, the outdoor lights 620 may be adjusted in any number of ways, including but not limited to increasing light intensity to illuminate the live event 930, modulating to draw pedestrian attention to the vehicle 100, or remaining steadily lit in a decorative manner. Any combination of providing a live event 930, providing video content 940, providing audio content 950, and providing lighting effects 960, in accordance with the present invention, may be used.

At 970, upon the completion of the live event 930, it is determined whether the vehicle has reached a final predetermined location 820 along the predetermined route. If not, the vehicle 100 may resume driving along the predetermined path 810, at 910, until it arrives at another predetermined location 820, at 920, wherein another live event 930 may be displayed. If the vehicle 100 has reached a final predetermined location, which in an embodiment may be at the same location as where persons first boarded vehicle 100, the journey concludes at 972, and persons in the vehicle 100 may disembark.

While certain embodiments of the invention have been shown and described it is evident that variations and modifications are possible that are within the spirit and scope of the following claims. The disclosed embodiments have been provided solely to illustrate the principles of the invention and should not be considered limiting in any way.

What is claimed is:

1. A vehicle comprising:
    a cabin defined by a front, a back, a roof, a floor, a first side that connects the front, the back, the roof, and the floor, and a second side opposite the first side that connects the front, the back, the roof, and the floor, the front being forward of the back relative to a direction of movement when the vehicle moves in a forward direction;
    a window having a surface area that covers at least 50% of the first side;
    a plurality of seats in the cabin arranged to face the first side, the plurality of seats being arranged in at least two rows, a first row of seats having a first elevation relative to the floor, and a second row of seats having a second elevation relative to the floor, the second elevation being greater than the first elevation; and
    a video system comprising a plurality of video monitors located at the first side.

2. The vehicle according to claim 1, further comprising a second window, having a surface area that covers at least 50% of the roof.

3. The vehicle according to claim 2, wherein the second window is located on a portion of the roof near the first side.

4. The vehicle according to claim 1, wherein the monitors are spaced apart from one another along a length of the first side.

5. The vehicle according to claim 1, wherein the second row of seats is staggered relative to the first row of seats.

6. The vehicle according to claim 1, wherein the plurality of seats is arranged in three rows, a third row of seats having a third elevation relative to the floor, the third elevation being greater than the second elevation.

7. The vehicle according to claim 6, wherein the third row of seats is staggered relative to the second row of seats.

8. The vehicle according to claim 1, wherein the video system is configured to provide different video content to at least two of the video monitors.

9. The vehicle according to claim 1, wherein the video system is configured to provide video content to the video monitors that corresponds with content outside of the window.

10. The vehicle according to claim 1, further comprising an audio system comprising a plurality of speakers within the cabin, the audio system being configured to provide audio content to the speakers that correspond with content outside of the window.

11. The vehicle according to claim 1, wherein the video system is configured to be synchronized with movement of the vehicle.

12. The vehicle according to claim 11, further comprising an audio system comprising a plurality of speakers within the cabin, the audio system is configured to be synchronized with movement of the vehicle.

13. The vehicle according to claim 12, wherein the audio system is configured to be synchronized with the video system.

14. The vehicle according to claim 13, further comprising a controller configured to control the video system and the audio system.

15. The vehicle according to claim 14, further comprising a user interface connected to the controller, the user interface being configured to allow a user to change images and/or sounds being outputted by the video monitors and the speakers, respectively.

16. The vehicle according to claim 15, wherein the user interface is located near the back of the cabin.

17. The vehicle according to claim 15, further comprising a lighting system comprising a plurality of indoor lights within the cabin, the plurality of indoor lights being connected to the controller.

18. The vehicle according to claim 17, wherein the user interface is configured to allow the user to control an amount of power provided to each of the indoor lights.

19. The vehicle according to claim 17, wherein the indoor lights are synchronized with the video system and/or the audio system.

20. The vehicle according to claim 15, further comprising a plurality of outdoor lights located outside of the cabin, the plurality of outdoor lights being connected to the controller.

21. The vehicle according to claim 20, wherein the user interface is configured to allow the user to control an amount of power provided to each of the outdoor lights.

22. The vehicle according to claim 21, wherein the outdoor lights are synchronized with the video system and/or the audio system.

23. The vehicle according to claim 1, wherein the vehicle is a bus.

24. A method for providing entertainment, the method comprising:
    providing a live event outside a vehicle comprising a window having a surface area covering at least 50% of a first side of the vehicle, and a plurality of video monitors located at the side of the vehicle, so that the live event may be seen through the window of the vehicle;
    providing a plurality of seats in the vehicle arranged to face the first side, the plurality of seats being arranged in at least two rows, a first row of seats having a first elevation relative to a floor, and a second row of seats having a second elevation relative to the floor, the second elevation being greater than the first elevation; and
    displaying video content on the video monitors, the video content being associated with the live event.

25. The method according to claim 24, further comprising driving the vehicle along a predetermined route.

26. The method according to claim 25, further comprising providing different live events at different locations along the predetermined route outside of the vehicle so that the different live events may be seen through the window of the vehicle.

27. The method according to claim 25, further comprising providing a live performance inside of the vehicle as the vehicle is driven along at least part of the predetermined route, wherein the live performance inside of the vehicle is associated with the live event outside of the vehicle.

28. The method according to claim 25, wherein at least two of the video monitors display video content that is different from each other.

29. The method according to claim 25, wherein the video content being displayed on at least one of the monitors comprises a map of the predetermined route and a current position of the vehicle on the predetermined route.

30. The method according to claim 25, wherein the video content being displayed on at least one of the monitors is prerecorded.

31. The method according to claim 25, further comprising broadcasting at least some of the video content being displayed on at least one of the monitors from a location that is not part of the predetermined route.

32. The method according to claim 25, further comprising delivering sound to a plurality of speakers on the vehicle, the sound being associated with the live event and/or surroundings of the vehicle.

33. The method according to claim 32, further comprising sensing a speed of the vehicle and adjusting the sound being delivered to the speakers based on the speed.

34. The method according to claim 33, wherein the sound is adjusted to individual speakers to simulate a sound moving relative to the vehicle.

35. The method according to claim 25, wherein the vehicle comprises a plurality of indoor lights, and further comprising controlling power to the plurality of indoor lights in accordance with the live event and/or the video content.

36. The method according to claim 25, wherein the vehicle comprises a plurality of outdoor lights, and further comprising controlling power to the plurality of outdoor lights in accordance with the live event and/or the video content.

* * * * *